No. 780,888. Patented January 24, 1905.

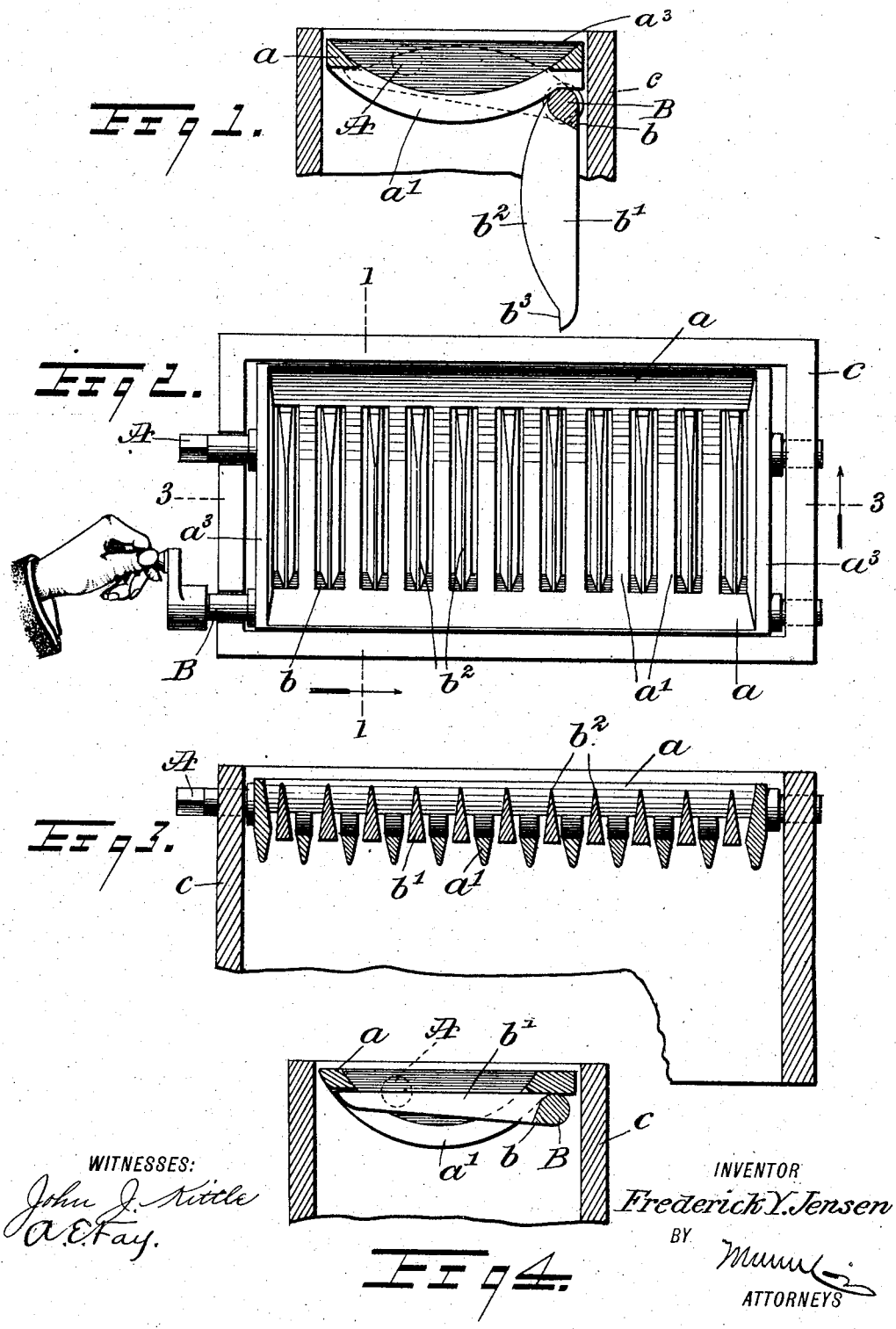

UNITED STATES PATENT OFFICE.

FREDERICK Y. JENSEN, OF EPHRAIM, UTAH.

GRATE.

SPECIFICATION forming part of Letters Patent No. 780,888, dated January 24, 1905.

Application filed June 6, 1904. Serial No. 211,285.

*To all whom it may concern:*

Be it known that I, FREDERICK Y. JENSEN, a citizen of the United States, and a resident of Ephraim, in the county of Sanpete and State of Utah, have invented a new and Improved Grate, of which the following is a full, clear, and exact description.

My invention relates to a grate in combination with a poker device; and the main object is to provide a structure of the character mentioned which may be operated to conveniently clean the grate.

Further objects of the invention will appear in the course of the subjoined description.

Reference is to be had to the accompanying drawings, forming a part of this specification, in which similar characters of reference indicate corresponding parts in all the figures.

Figure 1 is a sectional view of a preferred form of my improved grate on the line 1 1 of Fig. 2, showing the poker in lowered position. Fig. 2 is a plan view of the same, showing the poker in raised position. Fig. 3 is a sectional view on the line 3 3 of Fig. 2; and Fig. 4 is a sectional view similar to Fig. 1, showing a modification with the poker in raised position.

In the drawings, $a$ represents the grate proper, said grate being provided with cross-bars $a'$, which are preferably curved. The end pieces $a^3$ of the grate are preferably straight across the top, as shown in Fig. 1.

The poker device $b$ is provided with extending fingers $b'$, which may be caused to project through the spaces between the cross-bars $a'$ of the grate when the poker is raised, as shown in Figs. 2 and 3. The upper surfaces of these fingers are preferably curved at $b^2$, so as to project up between the grate-bars. A preferred form of this curve is shown in Fig. 1, and the action thereof is clearly illustrated therein. The ends of the fingers are preferably flattened, as shown at $b^3$. It is not necessary that the top of the fingers be curved; but they may be straight, as shown in Fig. 4, in which case the curvature of the bars $a'$ would preferably be upon a smaller diameter.

The poker device $b$ is provided with a shaft B, and the poker-fingers are rigidly connected with the shaft and normally hang down against the oven, as shown in full lines in Fig. 1. The grate $a$ is supported upon trunnions A and normally lies in a horizontal position. The whole device may be placed in a stove in the ordinary manner, or it may be placed in a casing such as that shown at $c$, and this casing may then be applied to the stove.

The operation of the device will be obvious. The turning of the shaft B will cause the poker device to swing upwardly and project the fingers through the spaces between the grate-bars, as shown in dotted lines $i$ Fig. 1. This effect is an important result of my invention, and it will result from either one of the constructions shown. It will be obvious also that other shapes of the grate and poker device may be employed with the application of the same principle. The raising of the poker to the position shown in dotted lines in Fig. 1 will loosen the ashes, and the grate is dumped by swinging the grate upwardly upon its shaft A when the ashes will drop down into the ash-pot. The shape of the fingers $b'$ is such as to prevent the clinkers and pieces of coal from becoming wedged between them and the cross-bars of the grate. The shape of the fingers and cross-bars is illustrated in Fig. 3, the fingers being sharp at the top and wide at the bottom, while the cross-bars are shown sharp at the bottom and wide at the top. For fine coal this construction is also very important, for the sharp edges on the fingers will readily work their way through the coal, and in withdrawing the fingers slowly the lumps will find a temporary rest on the grate-bar and be supported by one another and by the sides of the fingers, so that they will not drop through.

It will be observed that the grate rests upon the poker-shaft and protects the latter from fire. The air-spaces above the poker-shaft between the grate-bars provide for circulation.

Another important function of my invention is that the device may be operated to loosen the fire and facilitate a draft at any time while the fire is being built or afterward and that no jarring motion is employed to effect this purpose. In other words, a light and slow force is applied to the coals which will displace them as slightly as may be desired without shaking the life out of the fire. This construction is especially applicable to the making of fires with rubbish and the like, as the poker can be raised slightly for a few seconds to create a draft and then can be lowered to the position shown in full lines in Fig. 1 without disturbing the fire to too great an extent. The poker device may be placed to hang at the back of the fire toward the oven or can be reversed to hang at the front, as is desirable in some kinds of ranges.

It will be obvious that many modifications may be made in the embodiment of my invention illustrated in the drawings without departing from the spirit thereof, and I do not wish to be confined to the exact structure shown.

Having thus described my invention, I claim as new and desire to secure by Letters Patent—

1. The combination of a grate pivoted near one side and having flat-topped cross-bars spaced apart and curved downwardly in the center, with a shaft located below the side of the grate opposite to its pivotal points supporting said side of the grate and being protected thereby, and a series of poker-fingers mounted on and normally hanging down from the shaft, said poker-fingers being located below the spaces between said cross-bars and adapted to be projected into said spaces, and each finger having a convexly-curved sharp upper edge and a triangular cross-section.

2. The combination of a grate pivoted near one side and having cross-bars spaced apart and curved downwardly in the center, with a shaft located below and adapted to support the side of the grate opposite to its pivotal points, and a series of poker-fingers mounted on and normally hanging down from said shaft; said poker-fingers being located below the spaces between said cross-bars and adapted to be projected into said spaces, and each finger having a continuously-curved surface.

3. The combination of a grate pivoted near one side and having cross-bars spaced apart and curved downwardly between their ends, with a shaft located below and adapted to support the side of the grate opposite to its pivotal points and being protected thereby, and a series of poker-fingers mounted on the shaft; said poker-fingers having free ends, each finger being capable of extending into a space between the cross-bars and having its upper surface projecting beyond the upper surfaces of the cross-bars.

4. The combination of a grate, comprising a series of bars having spaces between them, the said grate being provided with supporting-pivots at its ends, and a poker comprising a shaft and a series of poker-fingers connected to the shaft, normally depending therefrom and capable of being projected into the spaces between said grate-bars, said grate resting at one side upon the shaft to which the poker-fingers are connected.

5. The combination of a grate comprising a series of parallel cross-bars having spaces between them, the said grate being provided with supporting-trunnions and a poker comprising a shaft and a series of poker-fingers rigidly mounted on the shaft, normally hanging down therefrom, and capable of being projected into the spaces between said cross-bars; said grate resting at one side on the shaft upon which the poker-fingers are mounted.

In testimony whereof I have signed my name to this specification in the presence of two subscribing witnesses.

FREDERICK Y. JENSEN.

Witnesses:
E. P. THOMANDER,
H. P. HANSON.